United States Patent
Xiao et al.

(10) Patent No.: US 8,628,867 B2
(45) Date of Patent: Jan. 14, 2014

(54) PATTERNED TEMPLATE WITH 1XN NUCLEATION SITE TO GRAIN GROWTH FOR UNIFORM GRAIN SIZE RECORDING MEDIA

(75) Inventors: Shuaigang Xiao, Fremont, CA (US); Thomas Young Chang, Menlo Park, CA (US); Yingguo Peng, San Ramon, CA (US); David Kuo, Palo Alto, CA (US); Kaizhong Gao, Eden Prairie, MN (US); Thomas Patrick Nolan, Fremont, CA (US); Ganping Ju, Pleasanton, CA (US)

(73) Assignee: Seagate Technology LLC, Cupertino, CA (US)

( * ) Notice: Subject to any disclaimer, the term of this patent is extended or adjusted under 35 U.S.C. 154(b) by 403 days.

(21) Appl. No.: 12/895,564

(22) Filed: Sep. 30, 2010

(65) Prior Publication Data

US 2012/0082866 A1 Apr. 5, 2012

(51) Int. Cl.
*G11B 5/66* (2006.01)
(52) U.S. Cl.
USPC ............... 428/831; 360/131; 428/831.2
(58) Field of Classification Search
None
See application file for complete search history.

(56) References Cited

U.S. PATENT DOCUMENTS

| | | | |
|---|---|---|---|
| 6,248,416 B1 | 6/2001 | Lambeth et al. | 428/65.3 |
| 6,537,638 B2 | 3/2003 | Do et al. | 428/65.3 |
| 6,677,051 B1 | 1/2004 | Acharya et al. | |
| 6,764,738 B1 | 7/2004 | Wu et al. | 428/65.6 |
| 7,128,988 B2 | 10/2006 | Lambeth | 428/831.2 |
| 7,919,029 B2 * | 4/2011 | Gauzner et al. | 264/225 |
| 8,048,546 B2 * | 11/2011 | Albrecht et al. | 428/831.2 |
| 2002/0034665 A1 | 3/2002 | Nakazawa et al. | |
| 2006/0222902 A1 | 10/2006 | Mukai | |
| 2007/0141401 A1 * | 6/2007 | Maeda et al. | 428/831.2 |
| 2008/0050616 A1 * | 2/2008 | Lee et al. | 428/827 |

FOREIGN PATENT DOCUMENTS

JP 2002-092864 3/2002

OTHER PUBLICATIONS

ISR and WO of the International Searching Authority for corresponding App No. PCT/US2011/046854 mailed on Feb. 27, 2012.

* cited by examiner

*Primary Examiner* — Holly Rickman

(57) ABSTRACT

A perpendicular magnetic media includes a substrate, a patterned template, a seed layer and a magnetic layer. The patterned template is formed on the substrate and includes a plurality of growth sites that are evenly spaced apart from each other. The seed layer is formed over the patterned template and the exposed areas of the substrate. Magnetic material is sputter deposited onto the seed layer with one grain of the magnetic material nucleated over each of the growth sites. The grain size distribution of the magnetic material is reduced by controlling the locations of the growth sites which optimizes the performance of the perpendicular magnetic media.

17 Claims, 12 Drawing Sheets

US 8,628,867 B2

PATTERNED TEMPLATE WITH 1XN NUCLEATION SITE TO GRAIN GROWTH FOR UNIFORM GRAIN SIZE RECORDING MEDIA

FIELD

This disclosure relates to a method for planarizing media.

BACKGROUND

Magnetic recording media is used in disk drives. The magnetic recording media includes a magnetic layer. A magnetic recording media having a vertical magnetic direction may have a higher data storage density than a magnetic recording media having a longitudinal magnetic recording direction.

BRIEF DESCRIPTION OF THE DRAWINGS

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

According to an embodiment.

DETAILED DESCRIPTION

The disclosure may be directed towards a perpendicular magnetic recording media that has reduced grain size and optimized grain size uniformity which may result in optimized recording performance in a magnetic media. Perpendicular magnetic recording media includes a thin magnetic film formed of a substrate using thin film deposition. The performance of the magnetic media is significantly affected by variations in the grain size of the magnetic material. The grain size is the spacing between adjacent grains of the magnetic material. The nucleation sites may be randomly selected on the substrate during deposition and the grains will grow in an arbitrary manner. This results in wide variations in the grain size.

The variations in the grain size are called the grain size sigma. If a layer of magnetic material is deposited using thin film deposition processes, the grain size sigma cannot be reduced below ~13% based on the Voroni model that mimics the random growth process of magnetic material on a recording media. A grain size sigma distribution of about 15% to 30% is typically observed in perpendicular recording media structures. Thin film deposition processes may also cause a significant variation in grain boundary thickness which causes intergranular exchange variation which may reduce magnetic recording performance.

In an embodiment, the grain size and the grain size sigma may be reduced by using a patterned template to control the placement of the magnetic grains of a perpendicular magnetic recording media. The reduced grain size and the grain size sigma may optimize the recording performance of various types of perpendicular magnetic media including, perpendicular magnetic recording media, discrete track recording (DTR) media and bit patterned media (BPM).

Figure 1:
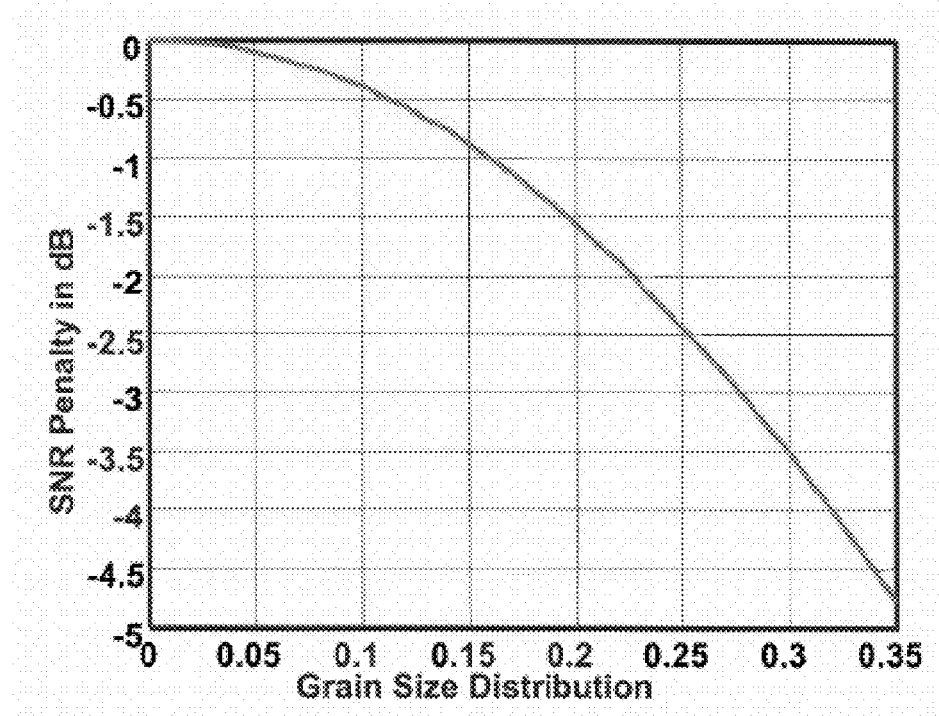
FIG. 1 illustrates a graph of a signal to noise ratio penalty v. magnetic grain size distribution.

FIG. 1 illustrates a graph showing how the signal to noise ratio (SNR) of a magnetic recording media may increase with larger magnetic material grain size variations. In a magnetic material layer having a uniform grain size, there is no SNR penalty. With a 0.1 (10%) grain size distribution there is about a −0.4 dB SNR penalty. This SNR penalty increases as the grain size distribution increases. At a 0.2 (20%) grain size distribution there is about a −1.6 dB SNR penalty and at a 0.3 (30%) grain size distribution there is about a −3.5 dB SNR penalty. With convention perpendicular media the grain size distribution may be about 15-30%. By utilizing the patterned template, the grain size variation may be controlled to less than a 5-10% grain size distribution. This results in an optimized SNR of 1-3 dB.

In an embodiment, the patterned template may have equally spaced growth sites that are formed on a media substrate. A seed layer may be deposited over the patterned template. A magnetic material may then be deposited on the seed layer. The grains or crystals of the magnetic material may be grown on the seed layer over the growth sites of the patterned template. A grain is a unit or a crystal of magnetic material that may be magnetized in a particular direction. In an embodiment, the grains or crystals of perpendicular magnetic recording media may be grown on the seed layer over the growth sites on the patterned template. The grains will grow to fill the space between the adjacent grains. By placing the growth sites at a uniform distance from each other, the template may control the size and positions of the magnetic grains. If the growth sites are in a uniform reduced space pattern, the growth site template may reduce the size and grain size sigma of the perpendicular magnetic grains.

Figure 2:
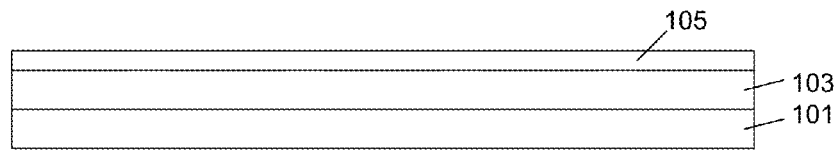
FIGS. 2-6 illustrate a lithography process for forming a patterned template.

Various different processes may be used to form the patterned template 103 including: lithography, nanoimprint, block copolymer and other methods. With reference to FIGS. 2-6, in an embodiment, a patterned template of growth sites may be formed by etching a layer of template material 103 deposited on the substrate 101 using a lithography process. The template may be made of any suitable material including: silicon, glass, non-magnetic metals, and other materials. FIG. 2 illustrates a substrate 101 with a template material 103 layer and a resist layer 105 deposited on a substrate 101. The substrate 101 may be made of any suitable material including: aluminum, silicon, glass, and other materials. The template material 103 may be any suitable material including: silicon, glass, non-magnetic metals, and other materials. The resist 105 may be deposited or applied to the filler material layer surface by spin-coating or other application methods. Suitable resist materials that may be used include: (1) UV-curable resist, liquid in form when applied and subsequently hardened by UV or electron beam irradiation induced cross-linking; and (2) thermal resist, softened by heating. See e.g., M. Colburn, I. Suey, B. J. Choi, M. Meiss, T. Bailey, S. V. Sreenivasan, J. G. Ekerdt and G. C. Wilson, J. Vac. Sci. Technol. B19, 2685 (20010; S. Chou, P. Krauss, and P. Renstom, Senience 272, 85 (1996). One example of UV-cured resist is Monomat available from Molecular Imprints, Inc. Another suitable resist is spin on glass: SOG such as hydro silsesquioxane (HSQ) which may be cured by exposure to an electron beam.

Figure 3:
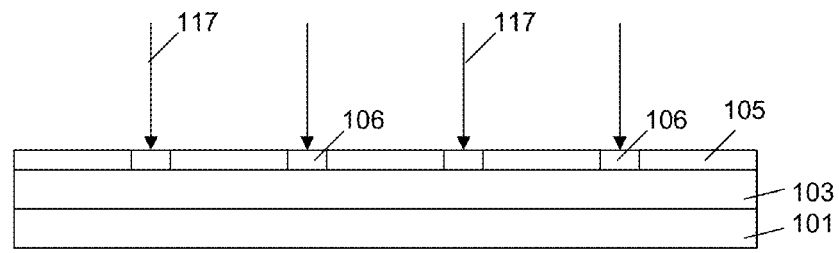

FIG. 3 illustrates an energy beam 117 directed at the resist layer 105. The portions of the resist layer 105 that are exposed to the energy beam 117 may be cured 106. The energy beam 117 may be an optical beam, an electron beam, an ion beam or any other suitable energy beam. In an embodiment, the energy beams 117 may simultaneously expose a patterned portion of the resist layer 105 to the energy beam. In other embodiments, the beam 117 may be pulsed on and off and scanned across the resist layer 105 to create the pattern.

Figure 4:
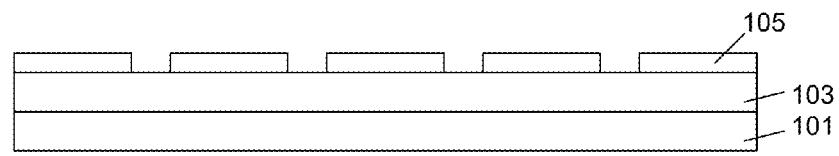
Figure 5:
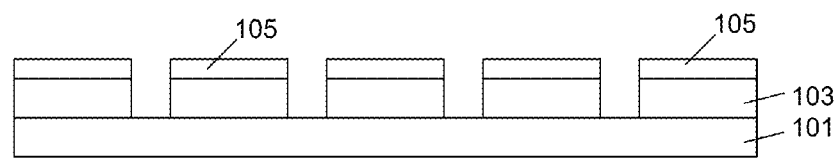
Figure 6:
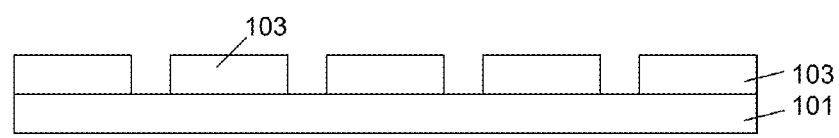

With reference to FIG. 4, in an embodiment, the cured areas of the resist 106 may be removed from the resist layer 105 and the underlying areas of the template material 103 are exposed. With reference to FIG. 5, the exposed areas of the template material 103 may be etched using an etch process such as reactive ion etching (RIE). In a RIE process, the media may be placed in a vacuum chamber and exposed to a plasma. The media may have a chemical and physical reaction with the exposed template material. The type of etch chemistry used in the etch processing may depend upon the type of template material being used. The RIE may remove the template material 103 and may not remove or damage the resist layer 105. With reference to FIG. 6, after the template material 103 has been etched, the patterned resist 105 may be removed. The process used to remove the photoresist layer 105 may depend upon the type of resist material being used. In an embodiment, the resist may be removed by using an aching process that may include a RIE with an oxygen ($O_2$) plasma. In other embodiments, any other suitable resist material removal process may be used.

In other embodiments, a nanoimprint process may be used to form the patterned template. In an embodiment, a thermally assisted nanoimprint lithographic process may be used for forming template material patterns. The thermally assisted nanoimprint lithography is described in U.S. Pat. Nos. 4,731,155; 5,772,905; 5,817,242; 6,117,344; 6,165,911; 6,168,845 B1; 6,190,929 B1 and 6,228,294 B1.

Figure 7:
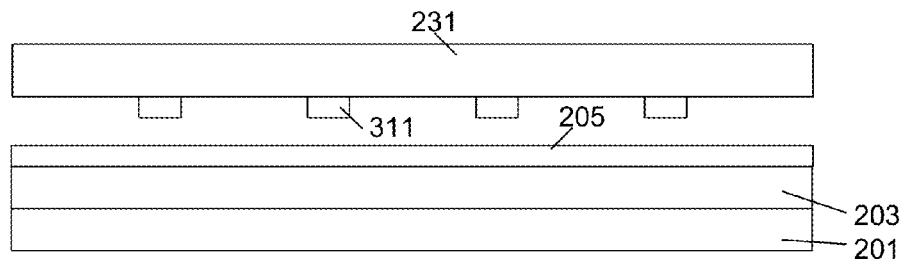
FIGS. 7-11 illustrate a nanoimprint process for forming a patterned template.

FIG. 7 illustrates a nanoimprint stamper 231 and a substrate 201 having a template material layer 203 and a nanoimprint resist layer 205. The stamper 231 may include an imprinting surface 233 that may have the opposite features of the patterned template. The nanoimprint resist 205 may be a thermoplastic polymer material, such as polymethylmethacrylate (PMMA), that may be formed on the substrate 201 surface by any appropriate technique, such as spin coating. The nanoimprint resist layer 205 may soften when heated above the glass temperature, $T_g$, such that the material exhibits low viscosity and enhanced flow.

Figure 8:
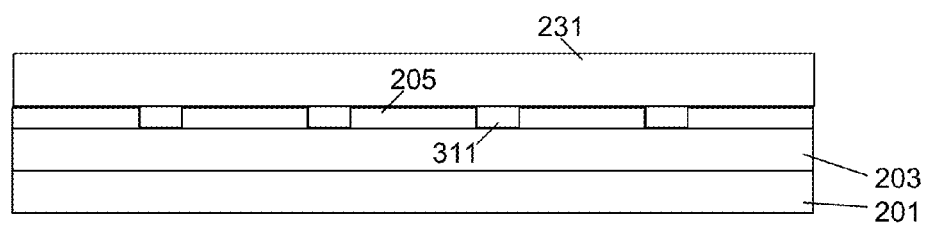

With reference to FIG. 8, a compressive molding process is illustrated. The stamper 231 may be pressed into the nanoimprint resist 205 and compressed regions 311 of the resist 205 may be formed. In the illustrated embodiment, the stamper 231 may not be pressed all of the way through the nanoimprint resist 205 and thus, the imprinting surface 233 may not contact the underlying template material layer 203. However, the top surface portions of the nanoimprint resist 205 may contact recessed portions of the stamper 231 and the top surface portions of the nanoimprint resist 205 may substantially conform to the shape of the recessed surfaces of the imprinting surface 233. Movement of the stamper 231 into the resist 205 may stop when the recessed surfaces of the stamper 231 contact the resist 205, due to additional resistance. This additional resistance may be due to the sudden increase in contact area when the entire imprinting surface of the stamper 231 is in contact with the resist 205. Because the compressive pressure may be distributed over the entire contact area, the compressive pressure over the depressed regions 311 may decrease when the compressive force is constant. The resist 205 may reflow until it conforms to the shape or surface contour of the data features 232 and the timing track features 230 of the stamper 231. The resist 205 may then be cured with the entire imprinting surface of the master template 201 in full contact with the resist 205.

The method used to cure the resist 205 may depend upon the type of thin film material being used. The thin film may commonly be cured through heat or light exposure as ultra violet (UV) light. If the thin film is cured with heat, the stamper 231, substrate 301 and resist 205 may be heated to the cure temperature of the resist 205. Alternatively, if UV light is used, the stamper 231 may be made of a UV transparent material such as glass or quartz. UV light may be transmitted through the stamper 231 to the resist 205.

Figure 9:
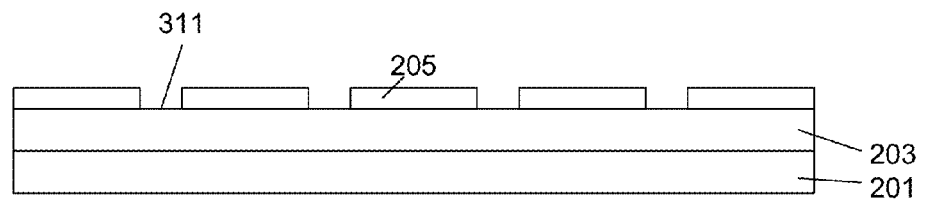

After the resist 205 has been cured, the stamper 231 may be removed from the resist 205. With reference to FIG. 9, the imprinted resist 205 includes a plurality of recesses formed at compressed regions 311. The surface-imprinted resist 205 may be etched to remove the residual material at the bottom of the compressed portions 311 and expose portions of the underlying template layer 203. The removal of the residual resist 205 may be accomplished by any appropriate process, such as RIE or wet chemical etching.

Figure 10:
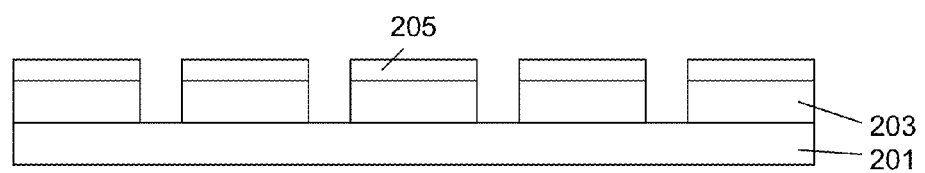
Figure 11:
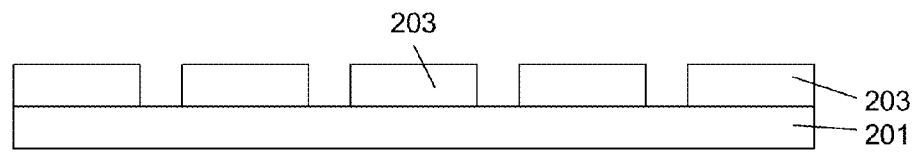

With reference to FIG. 10, in an embodiment, the exposed areas of the template material 311 may be etched using an etch process such as a RIE process. The type of etch chemistry may depend upon the type of template material being used. For example, an anisotropic etch can be used to create deep etch with steep sided vertical walls in the template material 311. The template material 311 can be etched through to the substrate 201. With reference to FIG. 11, after the template material 203 is etched, the patterned resist 205 may be removed. The removal process for the photoresist layer 105 may depend upon the type of resist material being used. In an embodiment, the resist may be removed by using an ashing process that may include a RIE with an oxygen ($O_2$) plasma. In other embodiments, any other suitable resist material removal process may be used. With the resist removed patterned template may be complete.

Figure 12:
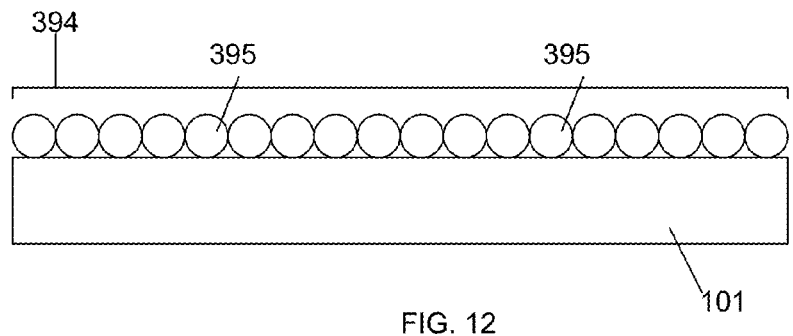
FIGS. 12-14 illustrate block copolymer processes for forming patterned templates.
Figure 13:
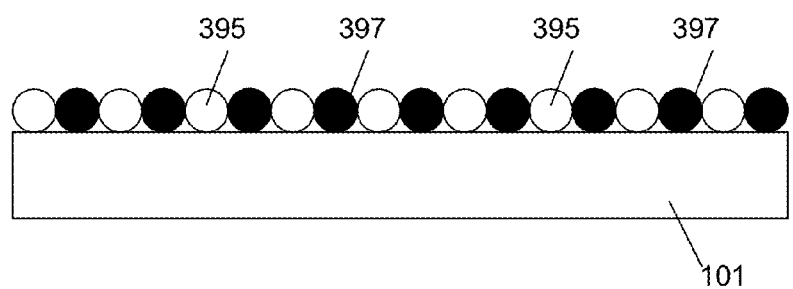
Figure 14:
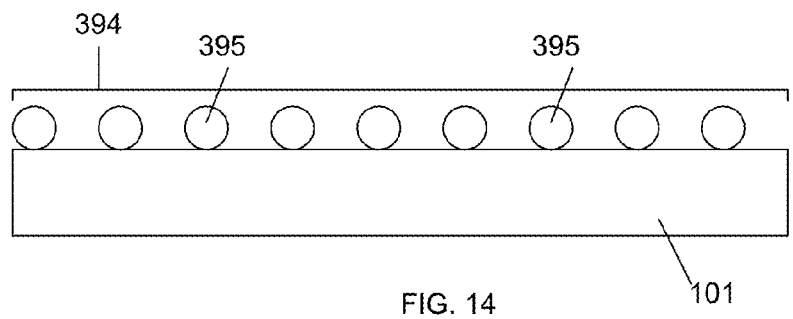

With reference to FIGS. 12-14, in other embodiments, a patterned template 394 may include growth sites 395 made from a block copolymer material. Block copolymers may comprise two or more homopolymer molecules linked by covalent bonds. Block copolymers with two distinct blocks are called diblock copolymers and block copolymers with three distinct blocks are called triblock copolymers. The block copolymers may be placed on the substrate 101 and may spontaneously self-assemble into a diversity of mesophases, with the size scale governed by the chain dimensions. The block copolymers may have sizes that range from about 2 nm to 30 nm. For simplicity, the growth sites 395 are illustrated in FIGS. 12-14 as spherical structures. However, in other embodiments, block copolymer growth sites can have various other shapes including: flat cylinders, taller cylinders, gyroids, lamellae and other shapes.

With reference to FIG. 12, a block copolymer template 394 is formed on the substrate 101 and the block copolymers 395 may self organize into a close packed pattern. The size and spacing of the block copolymers can vary depending upon the molecular weight and the type of block copolymer being used.

In other embodiments, it may be desirable to form a patterned template with nucleation growth sites that may be spaced farther apart. With reference to FIG. 13, a first type of polymer 395 and a second type of polymer 397 may be placed on the substrate 101. The first type of polymers 395 and the second type of polymers 397 may self organize into an alternating pattern. The first type of polymers 395 and the second type of polymers 397 may be cured on the substrate 101 by exposing the polymers 395, 397 to a solvent. With reference to FIG. 14, the solvent may remove the second type of polymer material 397 and leave the first type of polymer 395 on the substrate 101. The remaining polymers 395 may each be growth sites of the patterned template 394. In an embodiment, the polymer can be the same material as the patterned template material or the same material as the mask for pattern transfer into a template.

Figure 15:
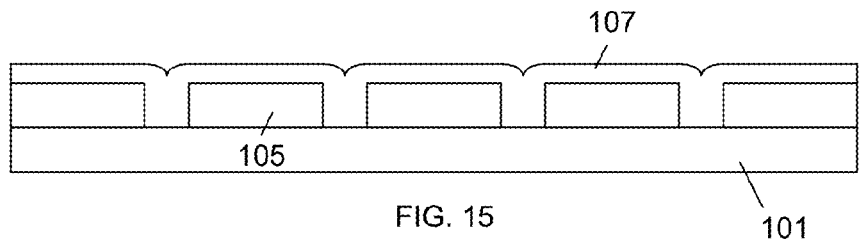
FIGS. 15-17 illustrate a process for forming a perpendicular magnetic media having a linear 1:1 nucleation site per grain ratio.

In other embodiments, the patterned template can be formed in other ways. After the patterned template has been formed, additional processing may be performed to create the perpendicular magnetic media. With reference to FIG. 15, a seed layer 107 may be deposited over the patterned template 105 using thin film deposition processes. The seed layer may be deposited by sputtering, chemical vapor deposition (CND), plasma enhanced chemical vapor deposition (PECVD), or any other suitable thin film deposition process. The seed layer 107 material fills the gaps between the growth sites 105 and covers the tops of the growth sites 105 of the patterned template 103. The seed layer 107 material may also nucleate over each of the growth sites 105 so that the thickness of the seed layer 107 can be greater over the growth sides than the spaces between the growth sites 105. The seed layer 105 material can be: Ru, NiFe, Ta50 Å\Au 100 Å, Ta50 Å\NiFe1000 Å, Ta50 Å\Ru1000 Å, Ta50 Å\Cu1000 Å, Indium Tin Oxide, combinations thereof or other seed materials.

Figure 16:
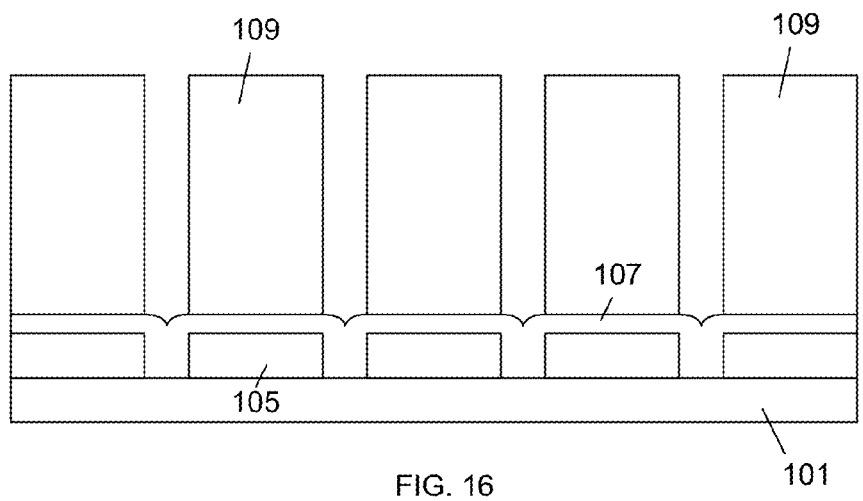

With reference to FIG. 16, a hard magnetic material 109 may be deposited on the seed layer 107 over the growth sites 105. In an embodiment, the magnetic material 109 may be sputter deposited. Individual grains of the hard magnetic material 109 may be magnetically attracted to the growth sites 105 and a single magnetic material grain may nucleate over each growth site 105. The grains will grow as additional magnetic material 109 is deposited over the growth sites 105. Possible magnetic materials 109 include materials having one or more elements selected from the group consisting of Cr, Fe, Ta, Ni, Mo, Pt, W, Cr, Ru, Ti, Si, O, V, Nb, Ge, B, and Pd. The magnetic material 109 can also be an alloy that comprises Co, Pt and Cr.

In an embodiment, one mechanism for selective growth of magnetic grains over growth sites is the enrichment of the seed layer 107 material over growth sites 105 or in the gaps between growth sites 105 during the deposition of the seed layer 107. This enrichment creates a patterned seed layer 107. The patterned seed layer 107 will then guide the growth of magnetic material 109 grains over those growth sites 105. In different embodiments, the growth sites may be either protruding islands as shown in FIGS. 6, 11, 12, 14 and 15-16 and other figures, or in other embodiments, the growth sites can be concave holes or trenches.

Figure 17:
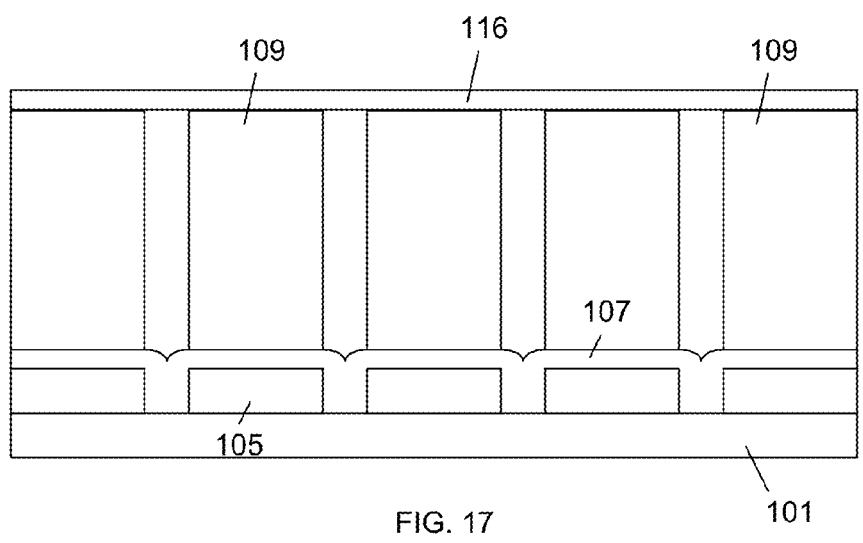

The nucleation of the magnetic material 109 over the template pattern 105 may result in uniform magnetic grains nucleating on the seed layer 107. Because the grain growth may be uniform over the patterned template 105, the grains of magnetic material 109 may also be uniform in height and size. Thus, the upper surface of the magnetic material 109 may not need to be planarized after the layer of magnetic material 109 is deposited. However, in other embodiments, a planarization process is performed on the upper surface of the magnetic material 109. With reference to FIG. 17, a protective layer 116 may be deposited over the hard magnetic material grains 109 to complete the perpendicular media. The protective layer 116 can be carbon or any other suitable protective material.

In embodiments where all of the grains of the hard magnetic material grain have been grown over a growth site of the template, this may be referred to as a 1:1 nucleation site per grain ratio. However, in other embodiments, the hard magnetic material grains may be grown over the template growth sites as well as spaces between the growth sites. By spreading the growth site locations, the patterning of the template may be simplified while the benefits of smaller grain size and smaller grain size sigma may still be achieved. This growth site per grain can be quantified as a ratio. For example, a linear 1:N nucleation site per grain, where N may be an integer of 2, 3, 4 or more.

Although patterning the initial template using a convention sputter process to form the recording grains or bits may be more feasible than forming the bit/grain by patterning the entire stack, this process still represents a significant challenge to form one nucleation site per grain noted as 1:1 nucleation site per grain. In an embodiment, the nucleation center to center distances of the growth sites, may be on the order of tenths or even sub-tenth nm in dimension for the areal density. Because the center to center dimensions may be very small, it may be easier to fabricate a patterned template with a 1:N nucleation sites per grain multiplication. This may enable a lower density center to center growth site distance patterned template to be used easing the template fabrication process. Grain multiplication may be possible since the sputtered grain growth favors a given mean grain size depending on seed layer material, thickness, and other processing parameters. The natural growth size section combined with fixed nucleation sites may promote uniform grain size growth in the absence of a fully patterned 1:1 growth template. In this approach, the commensurability between the patterned template growth sites period is patterned templates ($L_s$) and the grain period ($L_o$) in naturally forming grains. A relationship of $L_s \approx NL_o$ (N=1, 2, ... ) may lead to laterally ordered, equally spaced grains with significantly optimized size distribution compared with naturally forming grains without any substrate pattern guiding. Other non-integral ratios of $L_s/L_o$, such as $\sqrt{i^2+j^2+ij}$ (i, j=1, 2, ... ), may also be effective for 1:N grain growth.

Figure 18:
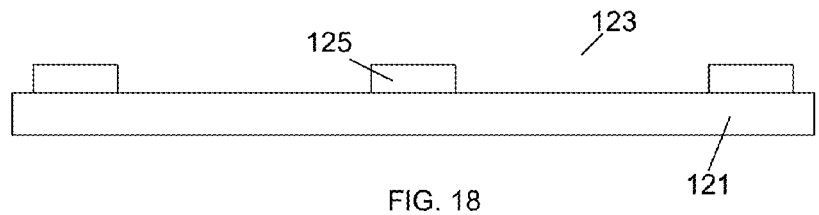
FIGS. 18-21 illustrate a process for forming a perpendicular magnetic media having a linear 1:2 nucleation site per grain ratio.
Figure 19:
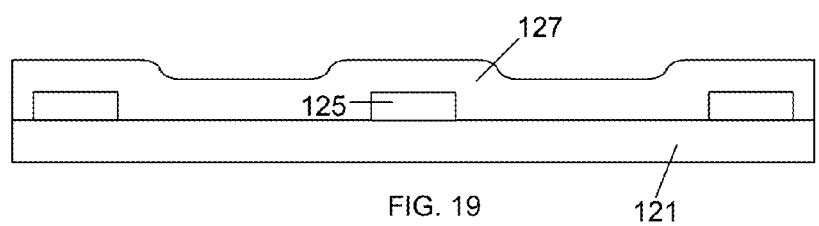
Figure 20:
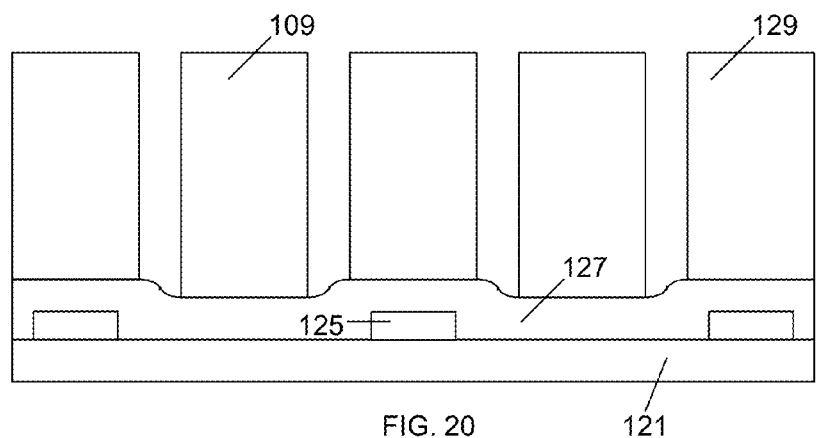
Figure 21:
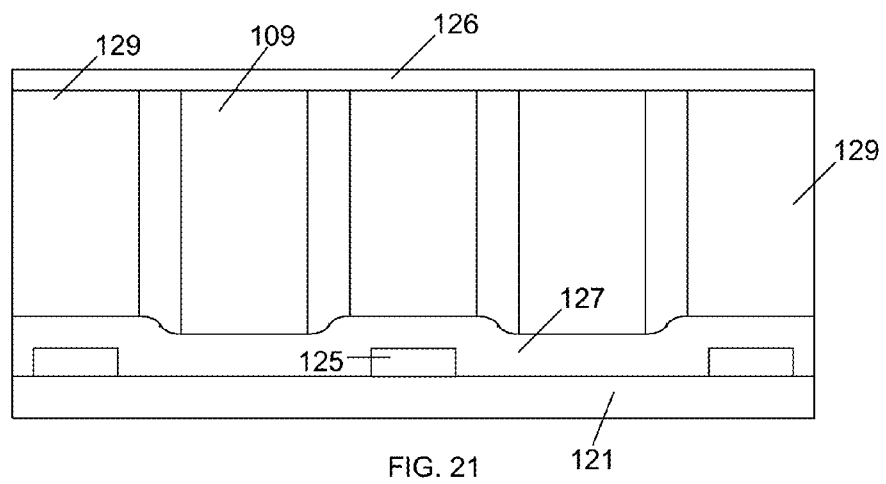

With reference to FIG. 18, a patterned template 123 is illustrated having growth sites 125 that may have a wider spacing so that an additional grain of magnetic material can be grown between the adjacent growth sites 125. With reference to FIG. 19, a seed layer 127 may be deposited over the patterned template 125 using thin film deposition processes. With reference to FIG. 20, grains of hard magnetic material 129 may be grown on the seed layer 127 directly over the growth sites 125 and between the growth sites 125. In the illustrated embodiment, the spacing between the growth sites 125 may be large enough for one grain of magnetic material 109 to be formed between two adjacent growth sites 125. With reference to FIG. 21, a protective layer 126 may be deposited over the hard magnetic material grains 109, 129 to complete the perpendicular media. Because there may be one nucleation site for every two grains of magnetic material, this may be a linear 1:2 nucleation site per grain ratio.

Figure 22:
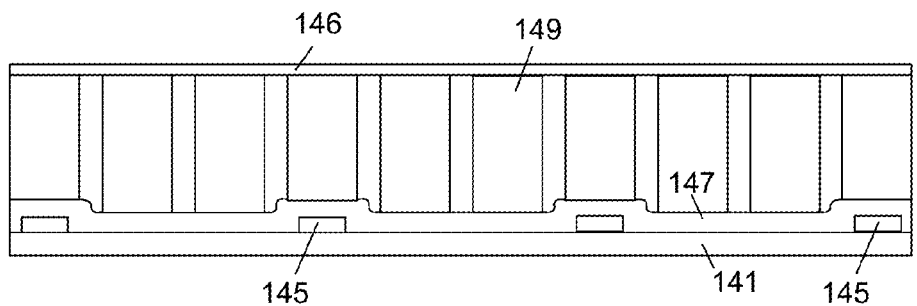
FIGS. 22-23 illustrate perpendicular magnetic media having a linear 1:N nucleation site per grain ratios.
Figure 23:
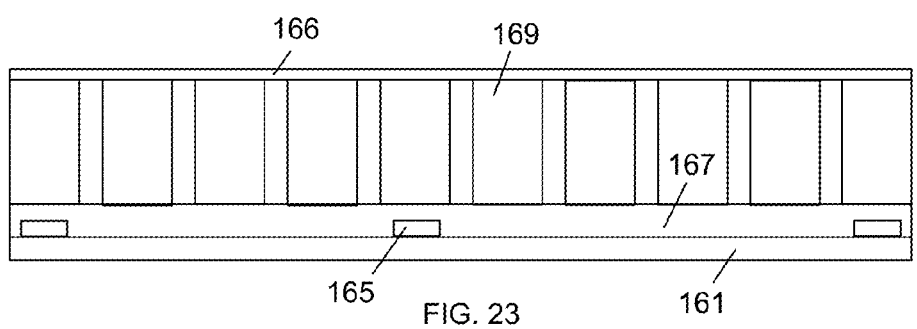

In other embodiments, the growth sites can be spread further apart. For example, with reference to FIG. 22, a media includes a substrate 141 and a patterned template having growth sites 145 that are spaced apart so that two grains of magnetic material 149 may be grown on the seed layer 147 between adjacent growth sites 145. A protective layer 146 may be formed over the grains of the magnetic material 149. This may be an example of a linear 1:3 nucleation site per grain media. With reference to FIG. 23, in an embodiment, the media may include a patterned template having growth sites 165 that are spaced apart so that three grains of magnetic material 169 may be grown on the seed layer 167 between adjacent growth sites 165. This may be an example of a linear 1:4 nucleation growth site per grain media.

Figure 24:
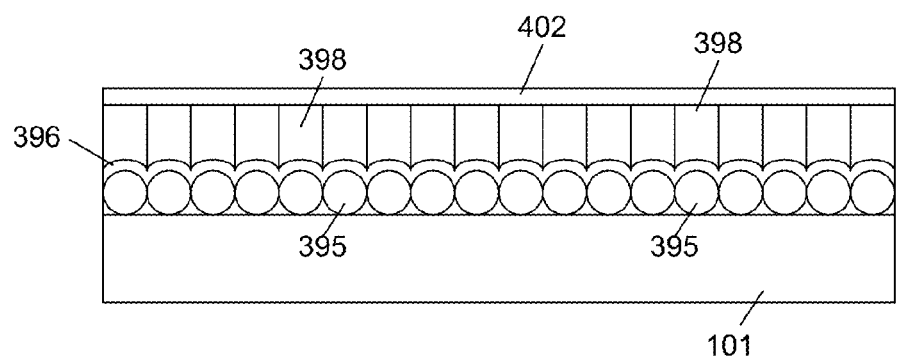
FIG. 24 illustrates a perpendicular magnetic media having a block copolymer patterned template and linear 1:1 nucleation site per grain ratio.

As discussed above with regard to FIGS. 12-14, block copolymers 395 can be used to form patterned templates. Perpendicular magnetic media may be formed on a seed layer 396 over the block copolymer 395 template. With reference to FIG. 24, a perpendicular magnetic media is illustrated having a block copolymer 395 template on a substrate 101. A seed layer 396 may be deposited over the block copolymer 395 growth sites. The magnetic material 398 may then be deposited on the seed layer 396 with one grain of the magnetic material 398 grown over each of the block copolymers 395. In an embodiment, a protective layer 402 can be deposited over the magnetic material 398 to complete the perpendicular magnetic media.

Figure 25:
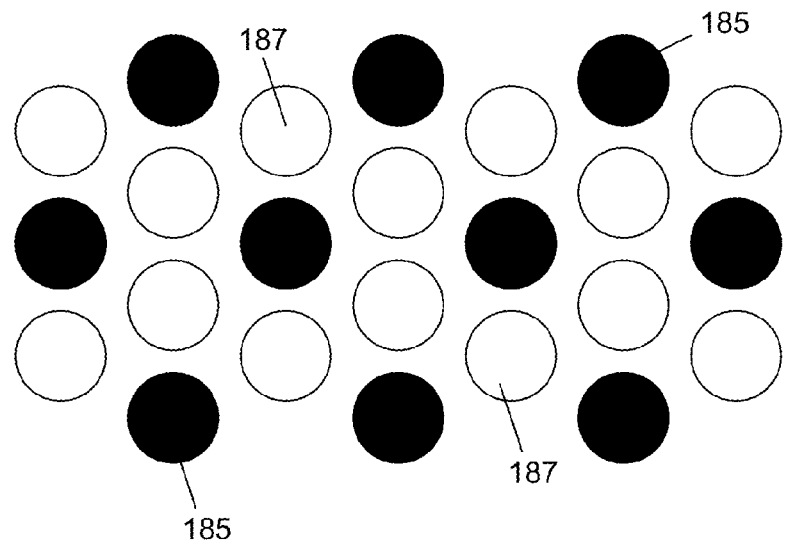
FIGS. 25-27 illustrate patterned templates having close packed configurations and area 1:N nucleation site per grain ratios.
Figure 26:
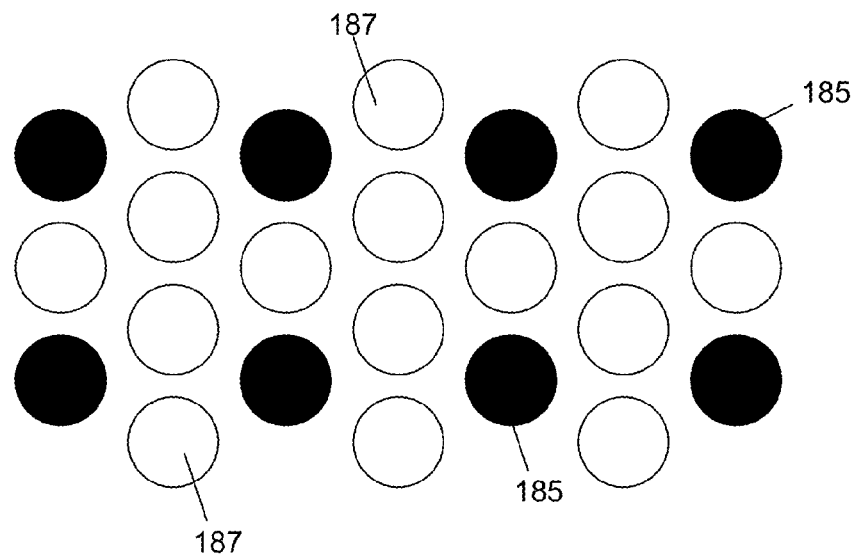
Figure 27:
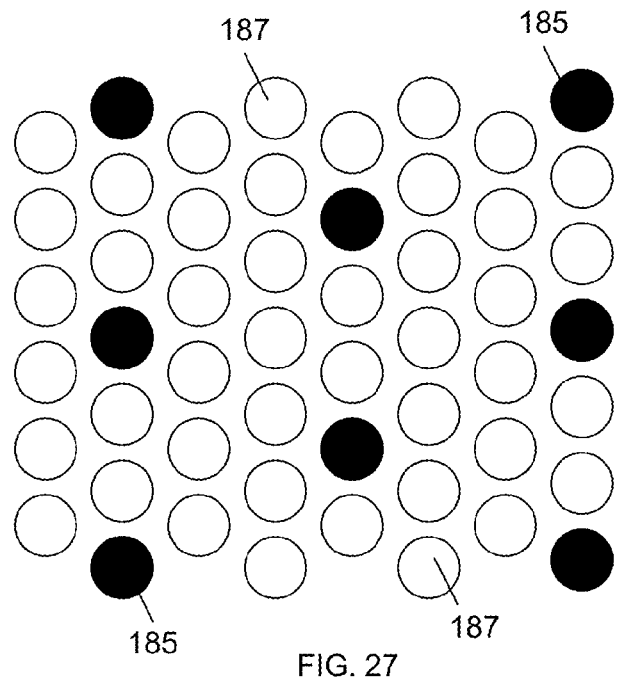

The patterned template may also control the two dimensional arrangement of the magnetic grains. For example, the template growth sites may be arranged in various two dimensional patterns including: a close packed pattern, a grid or any other suitable pattern. FIGS. 25-27 illustrate top views of embodiments of patterned templates having a close packed pattern that include growth sites 185 that a grain of magnetic material may be grown over and grain positions 187 between the growth sites 185 where a grain of magnetic material may be grown over. In FIG. 25, there may be an area 1:3 nucleation growth site per grain ratio. In FIG. 26 there may be an area 1:4 nucleation growth site per grain ratio. In FIG. 27 there may be an area 1:9 nucleation growth site per grain ratio.

Figure 28:
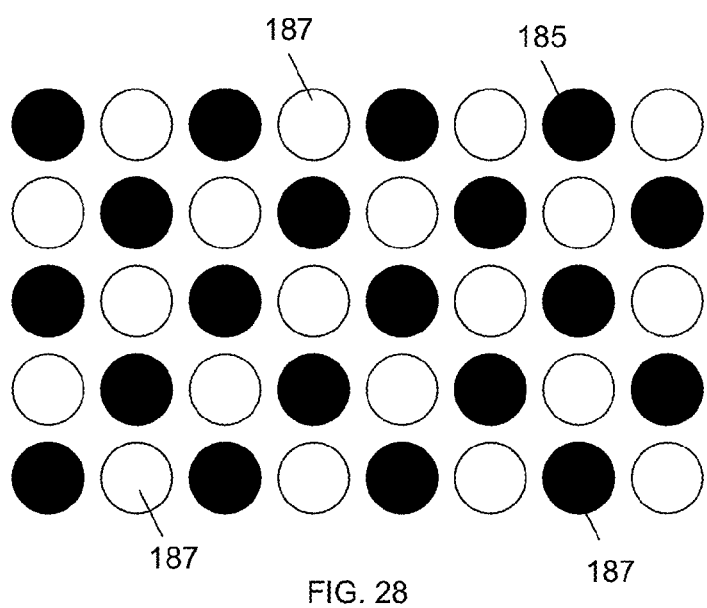
FIGS. 28-30 illustrate patterned templates having grid configurations and area 1:N nucleation site per grain ratios.
Figure 29:
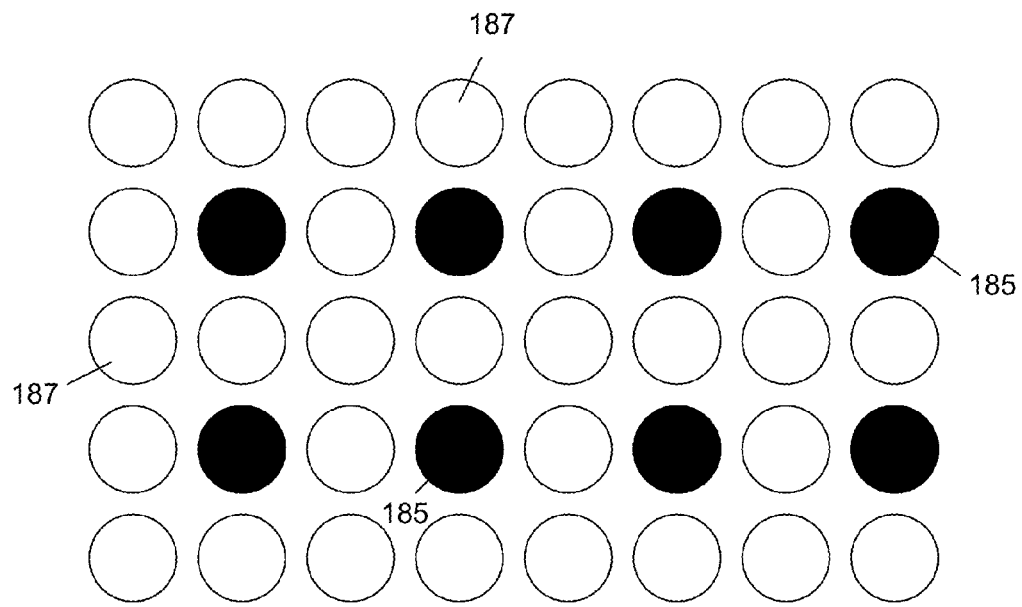
Figure 30:
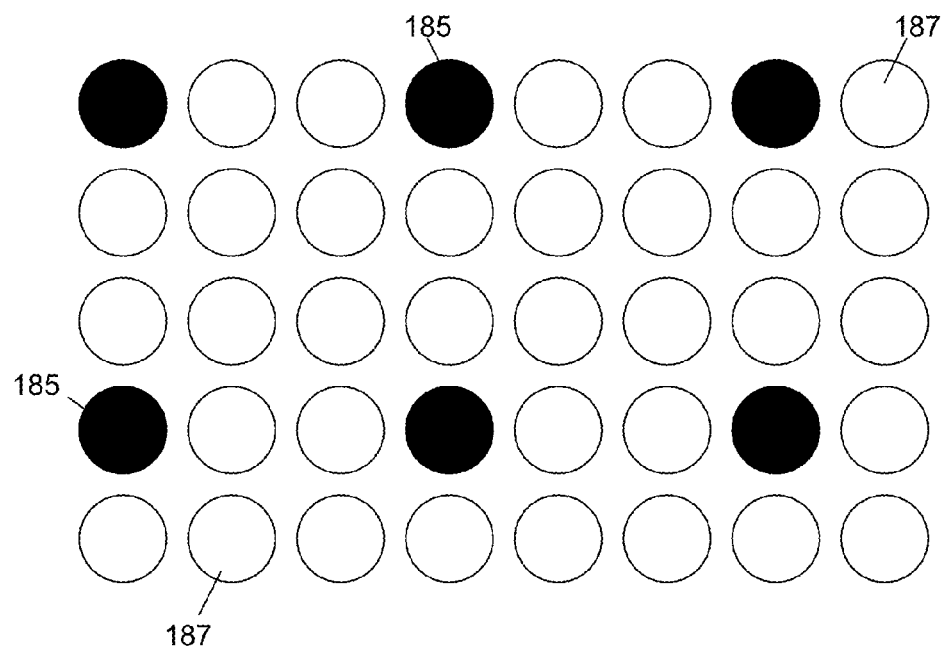

FIGS. 28-30 illustrate top views of embodiment of patterned templates having a grid pattern having growth sites 185 and grain positions 187. With reference to FIG. 28, there may be an area 1:2 nucleation growth site per grain media. With reference to FIG. 29, there may be a 1:4 nucleation growth site per grain media. With reference to FIG. 30, there may be a 1:9 nucleation growth site per grain media.

In addition to grain size uniformity, the patterned template may also be used to increase the grain size and grain density of the magnetic media. In perpendicular magnetic media, the areal density of data storage on an area of the media may be proportional to the magnetic material grain density. Thus, the magnetic grain size may be reduced and more grains may be grown on an area of the media to increase the areal density. In a normal magnetic material deposition process, it may be difficult to control the grain size grown on the seed layer due to the random positioning of nucleation sites which may be established during the deposition of seed layer. However, with a patterned template, the position and spacing of nucleation sites can be controlled and adjusted. Thus, the spacing of two neighboring magnetic material grains can be manipulated by adjusting the pattern of growth sites on the template so that a specific grain size is obtained. A pattern template may be an effective way to enable grain size reduction and increase areal density of the media.

The patterned template has been described with perpendicular media as a pattern of growth sites that are evenly distributed across the entire surface of the substrate. A seed layer may be deposited over the growth sites of the template and the grains of the magnetic material may be grown over and between the growth sites so that the grain size is uniform and the grain size sigma is minimized. In other embodiments, the patterned template of growth sites may also be used in patterned media. For example, the patterned template may be used to form DTR media and BPM. Rather than distributing the growth sites evenly across the substrate, the growth sites can be patterned over the areas of the substrate so the magnetic material may be organized into tracks or islands.

Figure 31:
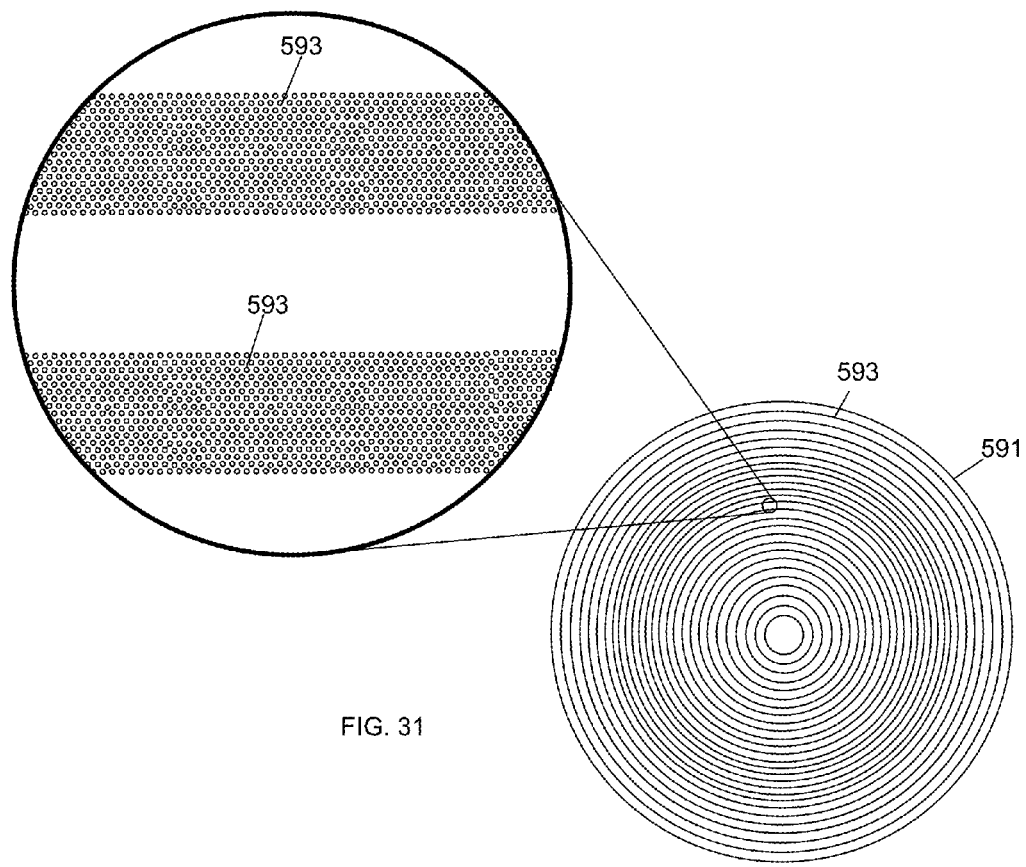
FIG. 31 illustrates a top view of a DTR patterned template.
Figure 32:
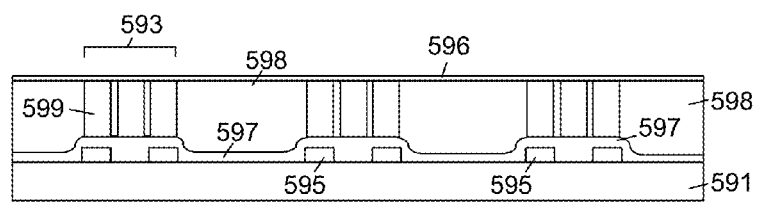
FIG. 32 illustrates a cross section view of a DTR media having a patterned template.

FIG. 31 illustrates a top view of an embodiment of a patterned template 593 formed on a substrate 591 for a DTR media. Rather than having growth sites distributed across the media substrate 591, the growth sites 595 can be arranged into a plurality of discrete circular tracks 593 around the substrate 591. With reference to FIG. 32, a cross section view of an embodiment of a DTR media is illustrated. A seed layer 597 may be deposited on the substrate 591 over the growth sites 595 and a grain of hard magnetic material 599 may be grown on each of the growth sites 595. One or more grains of hard magnetic material 599 may also be grown on the seed layer 597 between the adjacent growth sites 595. However, because the growth sites 595 may not exist on the areas of the substrate 591 between the discrete tracks of hard magnetic material 593, the magnetic material 599 may not be deposited on the areas of the substrate 591 between the discrete tracks 593. In an embodiment, a filler material 598 may be deposited on the areas of the substrate 591 between the discrete tracks 593. The upper surfaces of the filler material 598 and the magnetic material 593 may be planarized and a protective layer 596 may be deposited over the filler material 598 and the magnetic material 593 to complete the DTR media.

Figure 33:
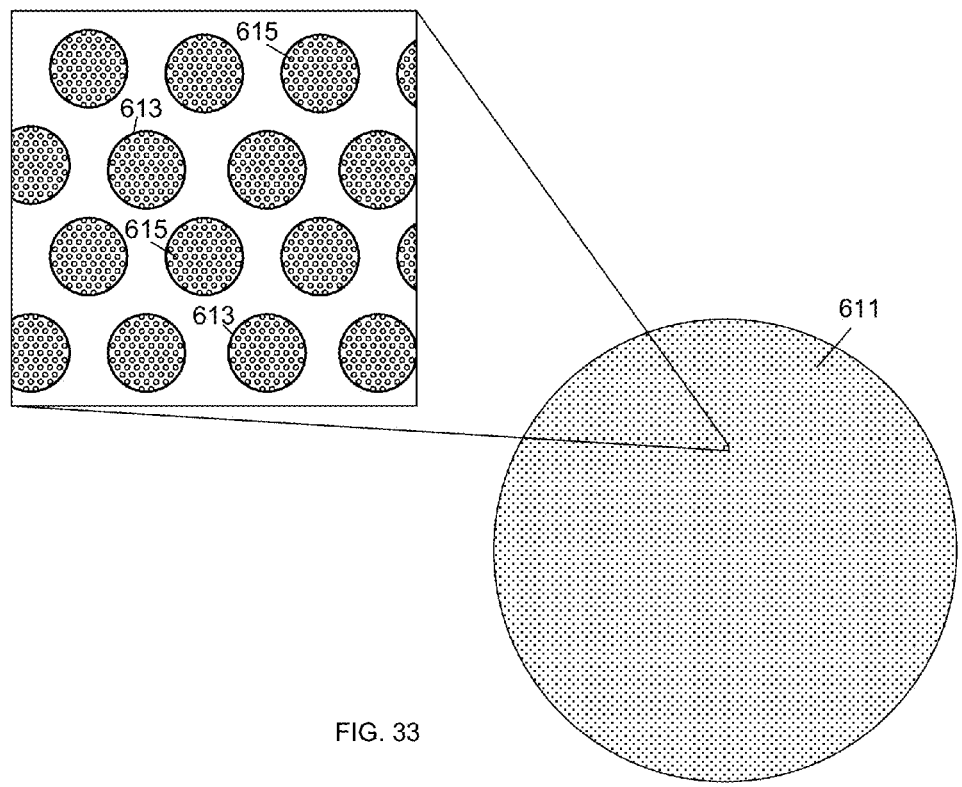
FIG. 33 illustrates a top view of a BPM patterned template; and According to an embodiment.
Figure 34:
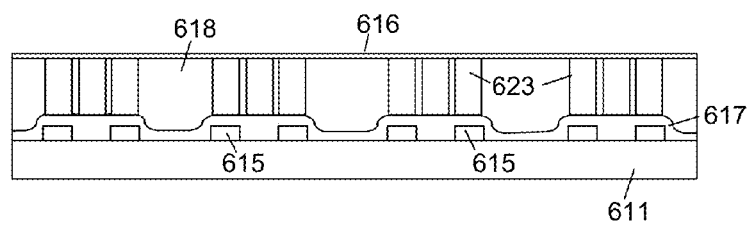
FIG. 34 illustrates a cross section view of a BPM having a patterned template.

With reference to FIG. 33, a top view of an embodiment of a BPM substrate 611 with a patterned template of growth sites 615 is illustrated. The growth sites 615 can be arranged as separate groups of growth sites 615 that form many discrete islands 613. The islands 613 may be arranged in circular tracks around the substrate 611. With reference to FIG. 34, an embodiment of a BPM is illustrated. During media fabrication, a seed layer 617 is deposited on the substrate 611 over the growth sites 615. The grain of hard magnetic material 623 may be nucleated on each of the growth sites 615 and one or more grains of hard magnetic material 623 may also be nucleated on the seed layer 617 between the adjacent growth sites 615. The groups of magnetic material 623 grains form discrete magnetic islands 613. Each island 613 may be individually magnetized and each island 613 may be used to store a bit of data. Because the growth sites 615 may only exist at the discrete islands 613, the magnetic material 623 may not nucleate over the areas between the discrete islands 613. A filler material 618 may be deposited on the substrate 611 between the magnetic islands 613. The upper surfaces of the filler material 618 and the magnetic islands 613 may be planarized and a protective layer 616 may be deposited over the filler material 618 and the magnetic islands 613 to complete the DTR media.

The present disclosure, in various embodiments, includes components, methods, processes, systems and/or apparatus substantially as depicted and described herein, including various embodiments, subcombinations, and subsets thereof.

What is claimed is:

1. An apparatus comprising:
   a template formed on a substrate, the template having a plurality of growth sites that are evenly separated from each other, wherein the growth sites comprise block copolymers having two or more homopolymer molecules;
   a seed layer formed over the template and in at least a portion of a gap between the growth sites; and
   a plurality of magnetic material grains deposited on the seed layer, such that at least one of the plurality of magnetic material grains is deposited on the seed layer over each of the plurality of the template growth sites.

2. The apparatus of claim 1, wherein a magnetic orientation of the plurality of magnetic material grains is substantially perpendicular to a plane of the substrate.

3. The apparatus of claim 1, further comprising: at least one of the plurality of magnetic material grains is deposited on the seed layer between the spaced apart growth sites.

4. The apparatus of claim 1, wherein the plurality of magnetic material grains have a grain size variation of less than about 10%.

5. The apparatus of claim 4, further comprising data recorded onto the plurality of magnetic grains with a signal to noise ratio of less than about −1 dB.

6. The apparatus of claim 1, wherein the plurality of magnetic material grains have a grain size less than about 30 nm.

7. The apparatus of claim 1, wherein the seed layer comprises a material selected from the group consisting of Ru, NiFe, Ta\Au, Ta\NiFe, Ta\Ru, Ta\Cu, $In_2O_3$\$SnO_2$ and combinations thereof.

8. The apparatus of claim 1, wherein the magnetic material comprises a material selected from the group consisting of Cr, Fe, Ta, Ni, Mo, Pt, W, Cr, Ru, Ti, Si, O, V, Nb, Ge, B, Pd and combinations thereof.

9. An apparatus comprising:
   a template formed on the substrate, the template having a plurality of growth sites that are evenly separated from each other and the growth sites forming patterned features on the substrate, wherein the growth sites comprise block copolymers having two or more homopolymer molecules;
   a seed layer formed over the patterned template and in at least a portion of a gap between the growth sites;
   a plurality of magnetic material grains deposited on the seed layer, such that at least one of the plurality of magnetic material grains is deposited on the seed layer over each of the plurality of the template growth sites; and
   a filler material formed on the seed layer between the growth sites.

10. The apparatus of claim 9, wherein the patterned features are circular tracks around the substrate.

11. The apparatus of claim 9, wherein the patterned features are discrete islands.

12. The apparatus of claim 11 wherein the discrete islands are arranged in circular tracks around the substrate.

13. The apparatus of claim 9, wherein a magnetic orientation of the plurality of magnetic material grains is substantially perpendicular to a plane of the substrate.

14. The apparatus of claim 9, further comprising: at least one of the magnetic material grains is deposited on the seed layer between the spaced apart growth sites.

15. The apparatus of claim 9, wherein the plurality of magnetic material grains have a grain size variation of less than about 10%.

16. The apparatus of claim 9, further comprising data recorded onto the plurality of magnetic grains with a signal to noise ratio of less than about −1 dB.

17. The apparatus of claim 9, wherein the plurality of magnetic material grains have a grain size less than about 30 nm.

* * * * *